United States Patent [19]

Marquet

[11] 3,930,159

[45] Dec. 30, 1975

[54] DEVICE FOR MEASURING THE COOLING TIME OF WELDS

[75] Inventor: Freddy Antoine Marquet, Beaufays, Belgium

[73] Assignee: Centre de Recherches Metallurgiques - Centrum voor Research in de Metallurgie, Brussels, Belgium

[22] Filed: Aug. 12, 1974

[21] Appl. No.: 496,738

Related U.S. Application Data

[63] Continuation-in-part of Ser. No. 494,919, Aug. 5, 1974, abandoned.

[30] Foreign Application Priority Data

Aug. 10, 1973 Belgium.............................. 803524

[52] U.S. Cl..................... 250/338; 250/342; 73/359
[51] Int. Cl.².......................................... G01K 7/02
[58] Field of Search....... 250/340, 338, 342; 73/359

[56] References Cited

UNITED STATES PATENTS

| | | | |
|---|---|---|---|
| 3,305,686 | 2/1967 | Carter et al..................... | 250/342 X |
| 3,309,236 | 3/1967 | Gunji.............................. | 250/338 X |
| 3,499,153 | 3/1970 | Stanfill........................... | 250/338 X |
| 3,666,949 | 5/1972 | Falco et al.......................... | 250/338 |

*Primary Examiner*—Archie R. Borchelt
*Attorney, Agent, or Firm*—Holman & Stern

[57] ABSTRACT

A thermocouple is longitudinally slidable in the barrel of a holder in the form of a pistol. The thermocouple is projected partially from the end of the barrel when a photo-electric cell carried by the pistol detects that a weld whose cooling time is to be measured has reached a predetermined temperature. The sighting axis of the cell intersects the axis of the thermocouple beyond the end of the barrel. An electronic circuit connected to the output of the thermocouple is adapted to start and stop a time meter at respective upper and lower given temperature values.

11 Claims, 6 Drawing Figures

DEVICE FOR MEASURING THE COOLING TIME OF WELDS

This is a continuation-in-part application of Ser. No. 494,919, filed Aug. 5, 1974, now abandoned.

The present invention relates to a device for measuring the cooling time of a weld in a simple rapid manner.

The thermal cycle (FIG. 1) undergone by the steel at a point located in the vicinity of a weld comprises a very rapid rise in temperature up to a maximum value, followed by a more or less slow fall in temperature according to the heat applied and the cooling possibilities of the weld. A heat cycle of this kind can be characterized by the maximum temperature achieved and by the cooling time measured within a temperature range which is selected by most researchers to be between 800°C and 500°C.

The cooling time affects the appearance of brittle structures under the bead and plays a part in the diffusion of hydrogen and in the setting up of stresses. These three parameters: brittle structures, hydrogen, and stresses, govern the cold cracking phenomenon.

Measuring the cooling time of welds is of great importance from the point of view of preventing the risk of cold cracking. Determining the operating conditions for welding, vis-a-vis the risk of cold cracking, requires this measurement to be carried out in a quick and easy way.

The cooling time which is to be measured is that which corresponds to a point in the steel located in the zone thermally affected by the weld, in the vicinity of the fusion line.

However, there is a relationship between the cooling time of the steel at point located in the vicinity of the weld and the cooling time in the metal deposited which can be easily measured in the following way: during the welding operation a thermocouple is immersed in the metal deposited and the time is measured between the emission of the signals corresponding to the two set temperatures, here 800°C and 500°C.

In order to make this measurement, it has been proposed to use a thermocouple mounted on a carriage which can slide on an inclined plane. This carriage is held in the high position by a return spring. A rapid release device enables the carriage to be freed and, at the end of its path, to project the thermocouple into the fused metal. The carriage is connected to a stationary electronic assembly which on the one hand allows the temperatures to be selected by isolating the signals corresponding to temperatures of 800° and 500°C and on the other of starting and stopping a chronometer or time meter.

The results obtained with this apparatus have been found quite satisfactory but the device has the disadvantages that it can only be used in laboratories and for welds which are easily accessible.

What is required is a device which allows these disadvantages to be overcome, by enabling the measurements to be made quickly and easily on the foundry floor, for example, in any position and even in places which are only accessible with difficulty.

The present invention provides a device for measuring the cooling time of a weld, comprising: a holder in the form of a pistol having a barrel and a butt; a thermocouple housed in the barrel and being slidable along a longitudinal axis of the barrel so as to extend from the end of the barrel; a photo-electric cell sensitive to thermal radiation from the fused metal of a weld, the cell being mounted on the holder and having an axis of sight which intersects the said longitudinal axis in front of the barrel; means for projecting the thermocouple partially from the barrel along the said longitudinal axis; a first electronic control circuit adapted to actuate the said projecting means when the temperature corresponding to the thermal radiation sensed by the cell reaches a predetermined limit, the control circuit being housed in the butt; and a second electronic control circuit, which is connected to an output of the thermocouple and which is adapted to start and stop a time meter at respective upper and lower given temperature values as measured by the thermocouple.

A preferred embodiment of the device, in the form of a pistol, comprises:

a barrel which serves as a housing for the thermocouple which is to be projected into the fused metal which constitutes the weld, the said thermocouple being held in place by means of a suitable spring;

a cell which is sensitive to the radiation issuing from the said fused metal, the line of sight of the said cell being inclined to the axis of the barrel, so that the converging point of these two axes can be located on the fused metal by suitably adjusting the position of the pistol;

a miniaturized electronic circuit housed in the butt of the pistol and controlled by the sensitive cell as a function of its curve of response and a temperature limit in order to release a detent system for the spring holding the thermocouple and to project the said thermocouple into the fused metal when the metal is at the preselected temperature;

a further electronic circuit controlled by the thermocouple to measure and select the temperatures as well as to stop and start a time meter, which enables the measurement of the cooling time of the fused metal between two given temperatures, for example between 800°C and 500°C.

The barrel preferably comprises two superposed parts, the lower part being integral with the remainder of the pistol and serving as a housing for the thermocouple, whilst the upper part is detachable and serves to cover and protect the thermocouple.

To reduce the risks of splashes of fused metal adhering to the pistol, the part covering the thermocouple and the part covering the sensitive cell are preferably made of brass.

The pistol may be provided with a pneumatic piston which can be displaced parallel to the longitudinal axis of the barrel and serves on the one hand to guide the thermocouple during its projection into the fusing metal and on the other to deaden the recoil movement to which the pistol is subjected.

The electronic circuit controlled by the thermocouple may be a miniaturized circuit housed in the pistol butt.

In the preferred embodiment of the invention, the pistol comprises a mechanism which allows the detent system for the spring holding the thermocouple in place to be manually released.

The device may include a magnetic base having a suitable concave shape to serve as a seat for the end of the butt and to fix the pistol on the piece to be welded. The end of the pistol butt which is to rest on the magnetic base is preferably of steel and spherical in shape.

Furthermore, the cell intended to receive the thermal radiation emitted by the fused metal is preferably an infra-red sensitive cell.

To reduce the weight of the pistol, the butt member and a case containing the compensating wire of the thermocouple are of aluminium.

The invention will be described further, by way of example only, with reference to the accompanying drawings, in which.

Figure 1:
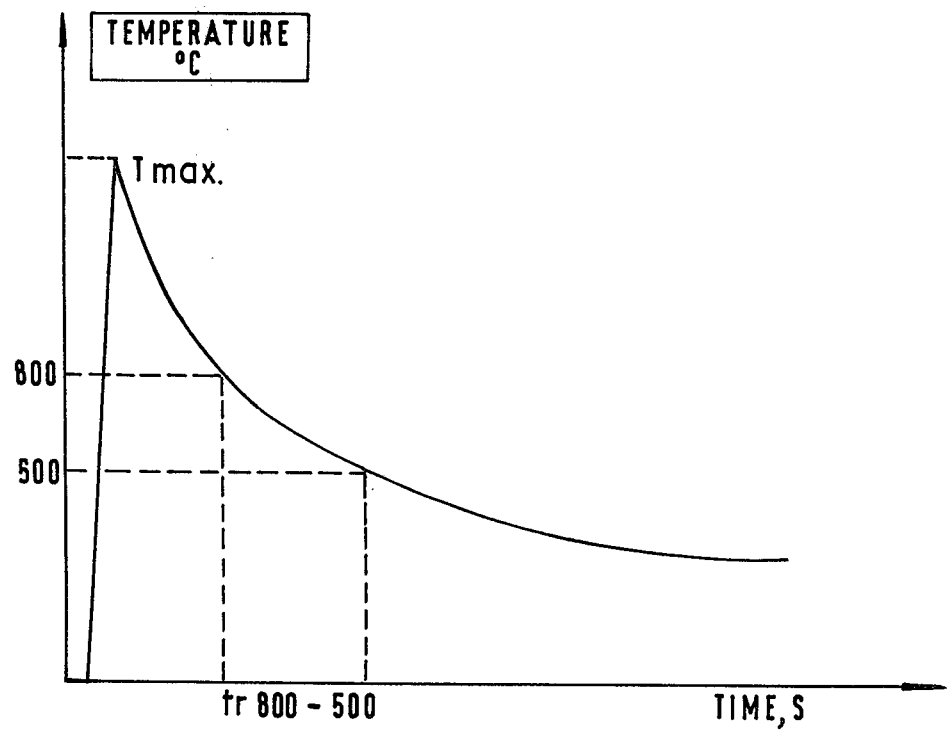
FIG. 1 is a graph of temperature against time, illustrating the thermal cycle undergone by steel near a weld.
Figure 3:
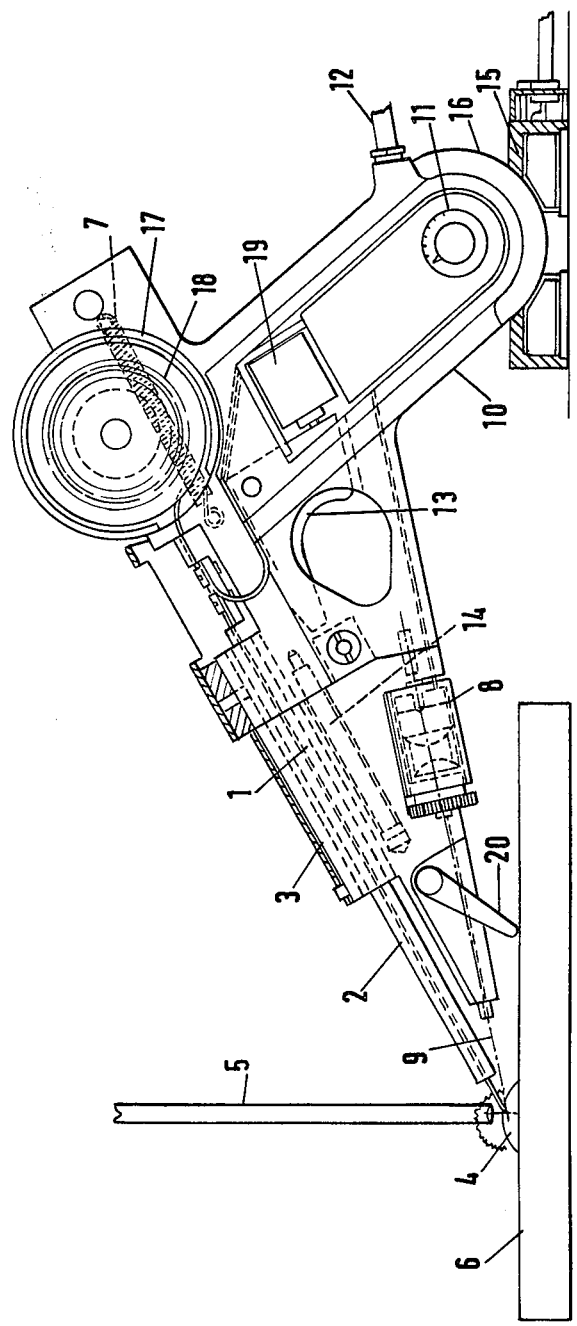
FIG. 3 is a part-sectional side view of a device for measuring the cooling time of a weld.

As explained above, one of the characteristics of the thermal cycle shown in FIG. 1 is the cooling time within a given temperature range. The cooling time can be measured during welding by immersing a thermocouple in the deposited metal and measuring the time between the emission of signals corresponding to two predetermined temperatures, e.g. 800°C and 500°C. FIG. 3 illustrates a device for measuring the cooling time in this way.

This device comprises a holder in the form of a pistol and has the advantages of being portable and easily manipulable, that is to say it lends itself for use on the foundry floor. The barrel of the pistol is in two parts, viz a lower part 1 which is integral with the remainder of the pistol and serves as a housing for a thermocouple 2, and an upper part 3 which is detachable and serves to cover and protect the thermocouple 2. The thermocouple 2 has a high melting point (rhenium-tungsten) and is to be projected into the fused metal 4 deposited by a welding electrode 5 onto a steel member 6. The thermocouple is held in place by means of a spring 7.

Below the barrel there is a photo-electric cell 8 which is sensitive to the infra-red thermal radiation emitted by the fused metal 4 which constitutes the weld. The line or axis 9 of sight of the cell 8 is inclined to the axis of the barrel (along which the thermocouple 2 extends) so that the point of intersection of these two axes can be located on the fused metal by adjusting the position of the pistol accordingly.

The upper part 3 of the barrel covering the thermocouple 2 and the part of the pistol covering the cell 8 are of brass in order to reduce the risk of splashes of fused metal adhering to them.

The device as illustrated also comprises a miniaturized electronic control circuit (in FIG. 5) housed in the butt 10 of the pistol and receiving a signal from the output of the infra-red sensitive cell 8 and a signal representing a predetermined temperature limit (about 1,100°C) set up on a potentiometer 11. Thus, by means of this circuit, the cell 8 causes a detent system of the spring 7, which keeps the thermocouple 2 in place, to be released and the thermocouple to be projected into the fused metal 4 when the temperature of the metal 4 reaches the predetermined limit.

Figure 2:
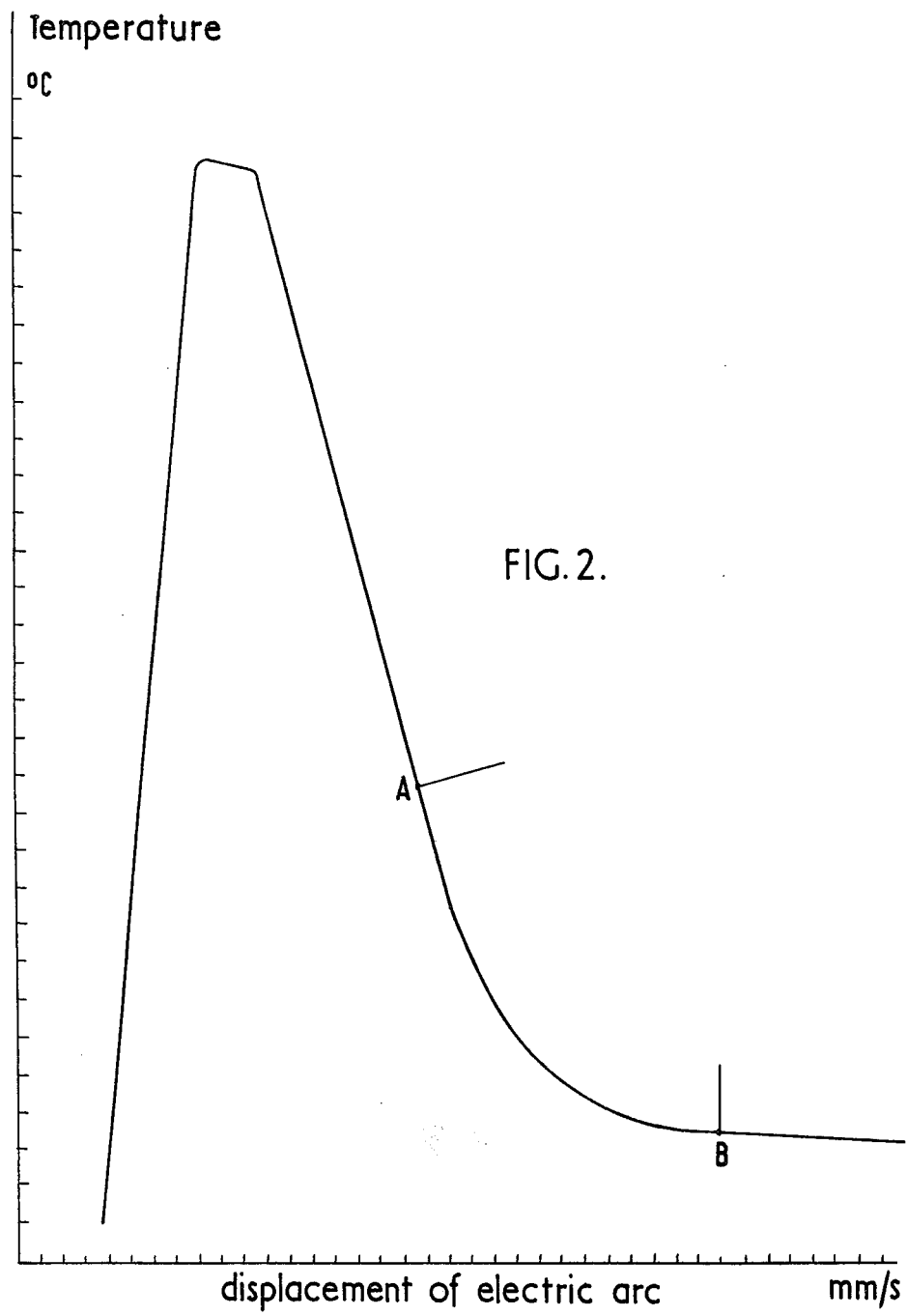
FIG. 2 is a graph of temperature against speed of displacement of a welding arc, illustrating the response of an infra-red sensitive photocell.

With reference to FIG. 2, the temperature at which the thermocouple is to be projected is predetermined to lie between the points A and B.

The device comprises a further electronic circuit (in FIG. 6) which is controlled by the thermocouple 2 in order to measure and select the temperatures as well as to stop and start a time meter. This circuit, which enables the cooling speed of the fused metal 4 to be measured between 800°C and 500°C is outside the pistol to which it is connected by the cable 12, which also serves to supply the electric energy necessary for the functioning of the device.

A trigger mechanism 13 is provided on the pistol for the manual release of the detent system of the spring 7 which keeps the thermocouple 2 in position.

A pneumatic piston 14 is displaceable in a cylinder parallel to the longitudinal axis of the barrel and serves on the one hand to guide the thermocouple 2 during its projection into the fusing metal 4 and on the other hand to deaden the recoil movement to which the pistol is subjected.

So that the pistol can be fixed on the members to be soldered without any other outside aid, a magnetic base 15 is provided which has a concave shape suitable for acting as a seat for the end 16 of the butt 10, this end being of steel and spherical in shape.

Furthermore, the barrel of the pistol is maintained in its working position by means of a prop 20 suitably fixed beneath the barrel to rest on the member 6 to be welded.

The butt 10 and the case 17 containing the compensating wire 18 of the thermocouple 2 are made of aluminium to reduce the weight of the pistol.

Figure 4:
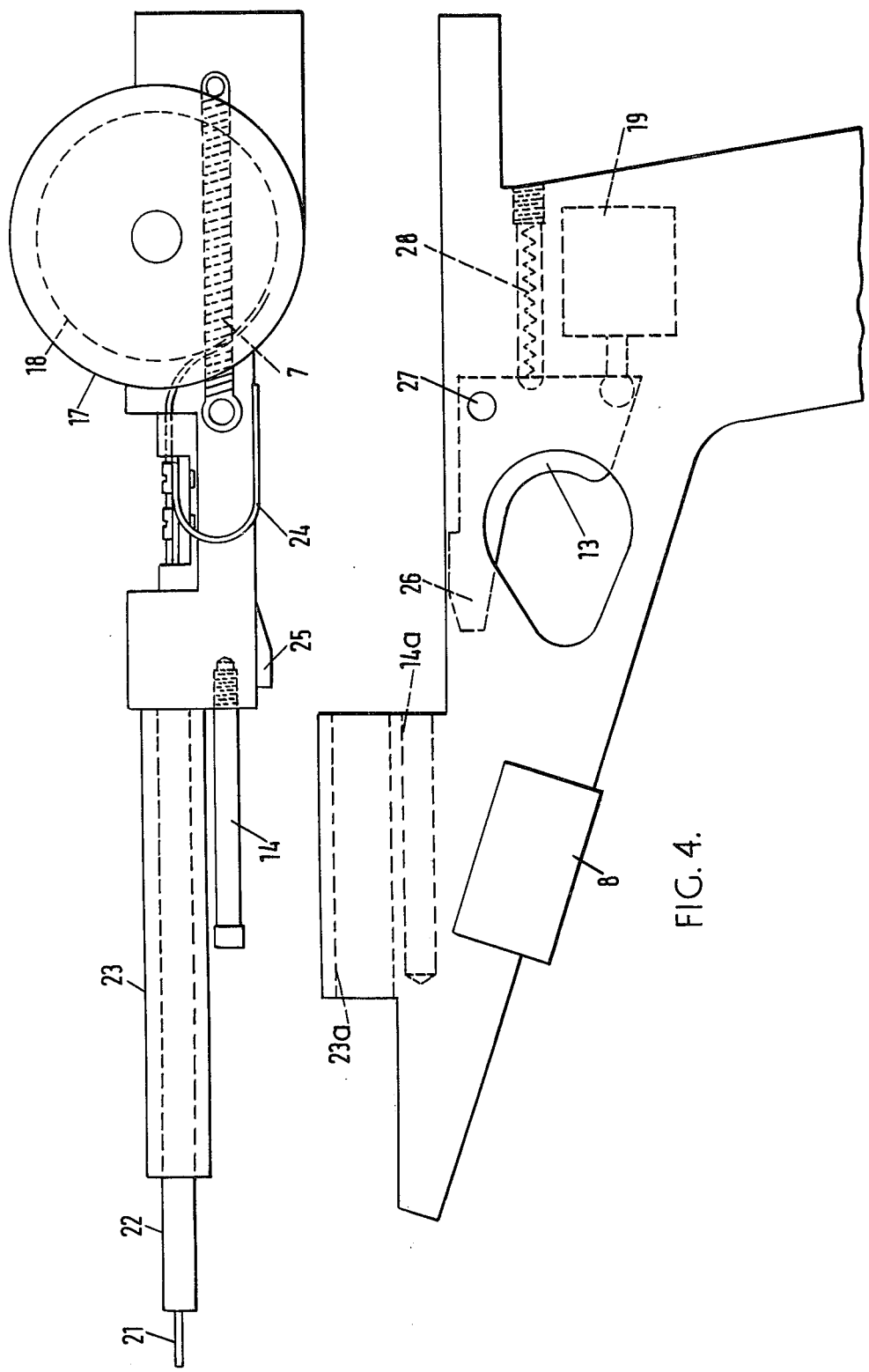
FIG. 4 is a partially exploded view of the device of FIG. 3, showing additional details thereof.

FIG. 4 shows the pistol as comprising a slide which carries the thermocouple 2, in which is shown as comprising wires 21, a sheath 22, and a sheath holder 23 which slides in a barrel part 23a integral with the main body part of the pistol. The slide also carries lamallae 24 which maintain the electric contact between the wires 21 and the compensating wire 18 in its case 17, the pneumatic piston 14 and a sear 25 cooperating with the trigger 13.

In order to set up the device the slide is moved towards the rear side of the pistol until the saw 25 is stopped and fixed by a pawl 26 on the trigger 13. This movement of the slide causes the spring 7 which has one end anchored in the body of the pistol to be extended to a sufficient tension to project the thermocouple 2 into the weld when a predetermined temperature of the fused metal 4 which constitutes the weld is reached.

The temperature of the fused metal 4 is measured by the photo-electric cell 8. When the set-up temperature is reached the electronic circuit of this cell 8 actuates the electromagnet 19 which causes the trigger to pivot about the point 27 and consequently the sear 25 to be freed from the pawl 26. With the freeing of the sear 25 the extended spring 7 can quickly release so that it causes the thermocouple to be projected into the fused metal 4.

The trigger 13 is normally maintained in its rest position by means of appropriate spring 28.

Figures 5, 6:
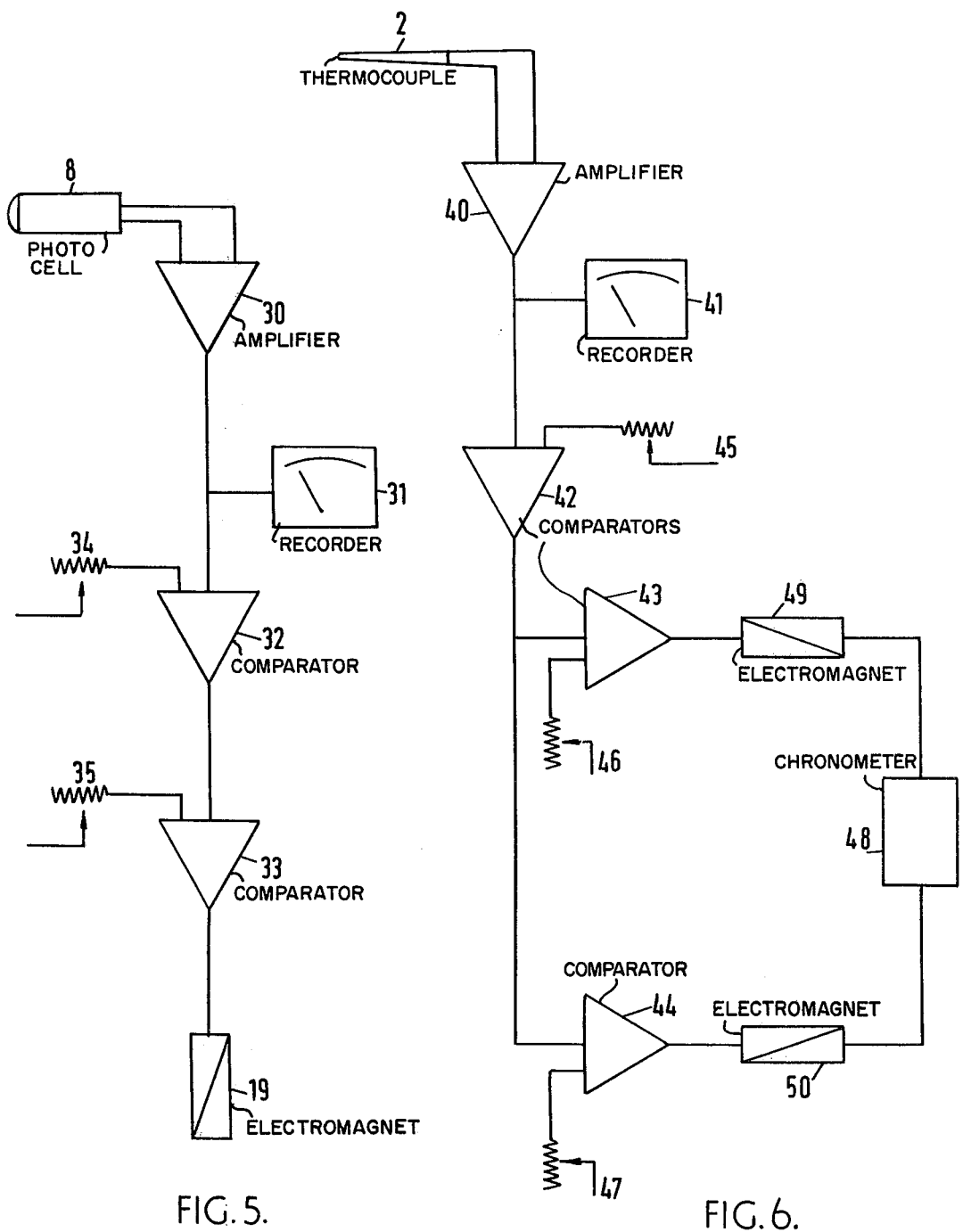
FIG. 5 is a block diagram of a control circuit for the device of FIGS. 3 and 4.
FIG. 6 is a block diagram of a control circuit for a timing device.

As shown in FIG. 5, the electronic circuit controlled by the cell 8 comprises: an amplifier 30 a recorder 31 of the temperature measured and two comparators 32, 33 which receive on the one hand the signal from the photo-electric cell 8 and on the other hand a signal from a potentiometer 34, 35, these latter signals being representative of two set-up temperatures.

The first set up temperature is chosen to assure that the temperature recorded is in the decreasing part of the graph illustrating the response of the cell 8. To this end this first set-up temperature is very high and when it is reached the comparator 32 allows the comparator 33 to work.

The second set-up temperature is the predetermined temperature at which the thermocouple is to be projected. When the temperature recorded is equal to the set-up temperature, the comparator 33 emits a signal which actuates the electromagnet 19 of the trigger 13 and consequently allows the thermocouple 2 to be projected into the fused metal 4.

FIG. 6 shows an electronic circuit controlled by the thermocouple 2 as comprising an amplifier 40, a recorder 41 of the temperature measured and three comparators 42, 43, 44 and three associated potentiometers 45, 46, 47.

The comparator 42 receives on the one hand the signal from the thermocouple and on the other hand the signal from the potentiometer 45, this latter signal being representative of a first set-up temperature. This first set-up temperature is chosen to assure that the temperature recorded is in the decreasing part of the graph of the temperature against time, given by the thermocouple. In the same way as in the electronic circuit of the photoelectric cell 8 the first set-up temperature is chosen very high and when it is reached, the comparator 42 allows the comparators 43 and 44 to work.

The second set-up temperature (set by the potentiometer 46) is 800°C and when it is reached the comparator 43 emits a signal which starts a chronometer or other time meter 48 by means of an electromagnet 49 in order to measure the cooling time between 800° and 500°C.

The third set-up temperature (set by potentiometer 47) is 500°C and when it is reached the comparator 44 emits a signal which stops the chronometer 48 by means of an electromagnet 50.

I claim:

1. A device for measuring the cooling time of a weld, comprising: a holder in the form of a pistol having a barrel and a butt; a thermocouple housed in the barrel and being slidable along a longitudinal axis of the barrel so as to extend from the end of the barrel; a photo-electric cell sensitive to thermal radiation from the fused metal of a weld, the cell being mounted on the holder and having an axis of sight which intersects the said longitudinal axis in front of the barrel; means for projecting the thermocouple partially from the barrel along the said longitudinal axis; a first electronic control circuit adapted to actuate the said projecting means when the temperature corresponding to the thermal radiation sensed by the cell reaches a predetermined limit, the control circuit being housed in the butt; and a second electronic control circuit, which is connected to an output of the thermocouple and which is adapted to start and stop a time meter at respective upper and lower given temperature values as measured by the thermocouple.

2. A device as claimed in claim 1, in which the said projecting means comprises releasable detent means for acting on a spring holding the thermocouple.

3. A device as claimed in claim 1, in which the barrel comprises two parts, a lower part which is integral with the remainder of the pistol and serves as a housing for the thermocouple, and an upper part which is detachable and serves to cover and protect the thermocouple.

4. A device as claimed in claim 1, in which the parts of the pistol covering the thermocouple and covering the sensitive cell are of brass.

5. A device as claimed in claim 1, in which the pistol includes a pneumatic piston which is displaceable parallel to the said longitudinal axis of the barrel and which guides the thermocouple during projection and deadens recoil of the pistol.

6. A device as claimed in claim 1, in which the second electronic circuit is housed in the butt of the pistol.

7. A device as claimed in claim 1, further comprising manual control means mounted on the pistol for actuating the said projecting means.

8. A device as claimed in claim 1, further comprising a magnetic base having a concave shape and serving as a seat for the end of the butt.

9. A device as claimed in claim 8, in which the end of the butt which is to rest on the magnetic base is made of steel and is spherical in shape.

10. A device as claimed in claim 1, in which the cell is sensitive to infra-red radiation.

11. A device as claimed in claim 1, in which the butt is made of aluminium.

* * * * *